United States Patent [19]
Obayashi

[11] Patent Number: 5,801,508
[45] Date of Patent: Sep. 1, 1998

[54] APPARATUS FOR CONTROLLING A POLYPHASE AC MOTOR IN QUICK-TORQUE AND HIGH-EFFICIENCY MODES

[75] Inventor: Kazuyoshi Obayashi, Kariya, Japan

[73] Assignee: Nippondenso Co., Ltd., Kariya, Japan

[21] Appl. No.: 691,592

[22] Filed: Aug. 2, 1996

[30] Foreign Application Priority Data

Aug. 4, 1995 [JP] Japan ................... 7-199536

[51] Int. Cl.$^6$ ................................................ H02P 7/00
[52] U.S. Cl. ............................................. 318/801; 318/139
[58] Field of Search ........................ 318/139, 798–822, 318/611; 363/41, 56

[56] References Cited

U.S. PATENT DOCUMENTS

| | | | |
|---|---|---|---|
| 4,392,100 | 7/1983 | Stanton et al. | 318/803 |
| 4,800,478 | 1/1989 | Takahashi | 363/41 |
| 5,153,491 | 10/1992 | Fujioka et al. | 318/578 |
| 5,446,363 | 8/1995 | Kurosawa et al. | 318/806 |
| 5,471,384 | 11/1995 | Nakashima et al. | 364/424.026 |
| 5,510,689 | 4/1996 | Lipo et al. | 318/809 |
| 5,610,490 | 3/1997 | King et al. | 318/611 |

OTHER PUBLICATIONS

Fetz et al; High Efficiency Induction Motor Drive with Good Dynamic Performance for Electric Vehicles, 1993, pp. 1–7.
Mizuno et al; "Comparison of Characteristics of an Induction Motor and a Permanent–Magnet Motor in a State of Constant–Output Operation", pp. 1–10 with Partial English Translation, 1993.

*Primary Examiner*—Jonathan Wysocki
*Attorney, Agent, or Firm*—Cushman Darby & Cushman IP Group of Pillsbury Madison & Sutro LLP

[57] ABSTRACT

An inverter circuit includes a plurality of sets each having a series combination of two switching elements. Two ends of each of the sets are connected to a vehicle battery. A junction between the two switching elements in each of the sets is electrically connected to a polyphase ac motor. A vector controller is operative for controlling the inverter circuit on the basis of a torque-current command value and a magnetizing-current command value. The vector controller includes a command value calculating device for calculating a motor-torque command value on the basis of a required torque, and an operation mode judging device for judging an operation mode to be a quicker-torque-response mode or a higher-efficiency mode on the basis of various conditions. The vector controller also includes a first calculating device for, in cases where the operation mode judging device judges the operation mode to be the higher-efficiency mode, calculating the magnetizing-current command value and the torque-current command value, which maximizes an energy efficiency, on the basis of the motor-torque command value. The vector controller further includes a second calculating device for, in cases where the operation mode judging device judges the operation mode to be the quicker-torque-response mode, fixing the magnetizing-current command value to a present value thereof or a given value and calculating the torque-current command value from the fixed magnetizing-current command value and the motor-torque command value.

7 Claims, 11 Drawing Sheets

APPARATUS FOR CONTROLLING A POLYPHASE AC MOTOR IN QUICK-TORQUE AND HIGH-EFFICIENCY MODES

BACKGROUND OF THE INVENTION

1. Field of the Invention

This invention relates to a control apparatus for a polyphase ac (alternating current) motor usable in, for example, an electric vehicle.

2. Description of the Prior Art

A known way of varying the torque of a polyphase ac motor is to increase or decrease a torque current while maintaining a magnetizing current at a constant level. This known way enables the torque response characteristics of the polyphase ac motor to be comparable to those of a dc motor.

Some electric vehicles use a polyphase ac motor as a drive power source. A known technique for enhancing the energy efficiency during the travel of such an electric vehicle has a step of deriving a command value of a motor torque from the degree of depression of an accelerator pedal, a step of calculating a command value of a torque current and a command value of a magnetizing current from the motor-torque command value, and a step of subjecting the polyphase ac motor to vector control responsive to the torque-current command value and the magnetizing-current command value. The calculation of the torque-current command value and the magnetizing-current command value is executed by referring to a map providing a predetermined relation among the motor-torque command value, the torque-current command value, and the magnetizing-current command value.

In the case where the previously-indicated known way is applied to an electric vehicle powered by a polyphase ac motor, the energy efficiency tends to be low and every full charging of a vehicle battery tends to enable only a short distance traveled by the vehicle.

According to the previously-indicated known technique, both an actual magnetizing current and an actual torque current vary as the motor-torque command value changes. The actual torque approximately follows the motor-torque command value. On the other hand, the magnetic flux caused by the actual magnetizing current slowly varies due to the influence of the second-order time constant of the polyphase ac motor. An actual motor torque is proportional to the product of the actual torque current and the magnetic flux. Therefore, the slow variation of the magnetic flux results in a slow response of the actual motor torque to the motor-torque command value. Thus, the electric vehicle tends to exhibit a poor acceleration response to the depression of the accelerator pedal.

SUMMARY OF THE INVENTION

It is an object of this invention to provide an improved control apparatus for a polyphase ac (alternating current) motor usable in, for example, an electric vehicle.

A first aspect of this invention provides a control apparatus for a polyphase ac motor which comprises a vehicle battery; an inverter circuit connected to the vehicle battery and including a plurality of sets each having a series combination of two switching elements, wherein two ends of each of said sets are connected to the vehicle battery, and a junction between the two switching elements in each of said sets is electrically connected to the polyphase ac motor; and a vector controller for controlling the inverter circuit on the basis of a torque-current command value and a magnetizing-current command value; wherein the vector controller comprises a) command value calculating means for calculating a motor-torque command value on the basis of a required torque such as a degree of depression of an accelerator pedal; b) operation mode judging means for judging an operation mode to be a quicker-torque-response mode or a higher-efficiency mode on the basis of various conditions, the quicker-torque-response mode attaching importance to torque response, the higher-efficiency mode attaching importance to energy efficiency; c) first calculating means for, in cases where the operation mode judging means judges the operation mode to be the higher-efficiency mode, calculating the magnetizing-current command value and the torque-current command value, which maximizes an energy efficiency, on the basis of the motor-torque command value; and d) second calculating means for, in cases where the operation mode judging means judges the operation mode to be the quicker-torque-response mode, fixing the magnetizing-current command value to a present value thereof or a given value and calculating the torque-current command value from the fixed magnetizing-current command value and the motor-torque command value.

A second aspect of this invention is based on the first aspect thereof, and provides a control apparatus wherein the command value calculating means is operative for calculating the motor-torque command value in view of measured values of currents flowing through the polyphase ac motor, a voltage across the vehicle battery, a rotational speed of the polyphase ac motor, and voltages among different phases of the polyphase ac motor.

A third aspect of this invention is based on the first aspect thereof, and provides a control apparatus wherein the operation mode judging means is operative for judging the operation mode to be the quicker-torque-response mode when a rate of a variation in the motor-torque command value calculated by the command value calculating means is great, and is operative for judging the operation mode to be the higher-efficiency mode when the rate of the variation in the motor-torque command value calculated by the command value calculating means is small.

A fourth aspect of this invention is based on the first aspect thereof, and provides a control apparatus further comprising a mode selection switch for manually selecting one out of the quicker-torque-response mode and the higher-efficiency mode, wherein the operation mode judging means is operative for judging the operation mode to be the quicker-torque-response mode when the quicker-torque-response mode is selected by the mode selection switch, and is operative for judging the operation mode to be the higher-efficiency mode when the higher-efficiency mode is selected by the mode selection switch.

A fifth aspect of this invention is based on the first aspect thereof, and provides a control apparatus further comprising remaining energy detecting means for detecting an amount of electric energy remaining in the vehicle battery, wherein the operation mode judging means is operative for judging the operation mode to be the higher-efficiency mode when the detected amount of electric energy remaining in the vehicle battery is small.

A sixth aspect of this invention is based on the first aspect thereof, and provides a control apparatus further comprising a low pass filter processing the magnetizing-current command value.

A seventh aspect of this invention is based on the first aspect thereof, and provides a control apparatus further comprising low pass filters processing the magnetizing-current command value and the torque-current command value respectively.

An eighth aspect of this invention provides a control apparatus for a polyphase ac motor which comprises first means for setting a fixed desired magnetizing current; second means for setting a desired torque current in response to a required torque output of the motor and the fixed desired magnetizing current set by the first means; and third means for supplying the motor with an actual magnetizing current and an actual torque current corresponding to the fixed desired magnetizing current set by the first means and the desired torque current set by the second means respectively.

A ninth aspect of this invention provides a control apparatus for a polyphase ac motor which comprises first means for changing operation of the motor between a first mode and a second mode;

second means for setting a first desired magnetizing current and a first desired torque current in response to a required torque output of the motor in cases where the operation of the motor is in the first mode; third means for supplying the motor with an actual magnetizing current and an actual torque current corresponding to the first desired magnetizing current and the first desired torque current set by the second means respectively in cases where the operation of the motor is in the first mode; fourth means for setting a second desired magnetizing current which is fixed in cases where the operation of the motor is in the second mode; fifth means for setting a second desired torque current in response to a required torque output of the motor and the second desired magnetizing current set by the fourth means in cases where the operation of the motor is in the second mode; and sixth means for supplying the motor with an actual magnetizing current and an actual torque current corresponding to the second desired magnetizing current set by the fourth means and the second desired torque current set by the fifth means respectively in cases where the operation of the motor is in the second mode.

A tenth aspect of this invention is based on the ninth aspect thereof, and provides a control apparatus wherein the first means comprises means for deciding whether or not a rate of a variation in the required torque output of the motor exceeds a predetermined threshold value, means for changing the operation of the motor to the second mode when the deciding means decides that the rate of the variation exceeds the threshold value, and means for changing the operation of the motor to the first mode when the deciding means decides that the rate of the variation does not exceed the threshold value.

An eleventh aspect of this invention is based on the ninth aspect thereof, and provides a control apparatus wherein the first means comprises a manual switch changeable between a first position and a second position, means for changing the operation of the motor to the first mode when the manual switch assumes the first position, and means for changing the operation of the motor to the second mode when the manual switch assumes the second position.

DESCRIPTION OF THE PREFERRED EMBODIMENTS

First Embodiment

Figure 1:
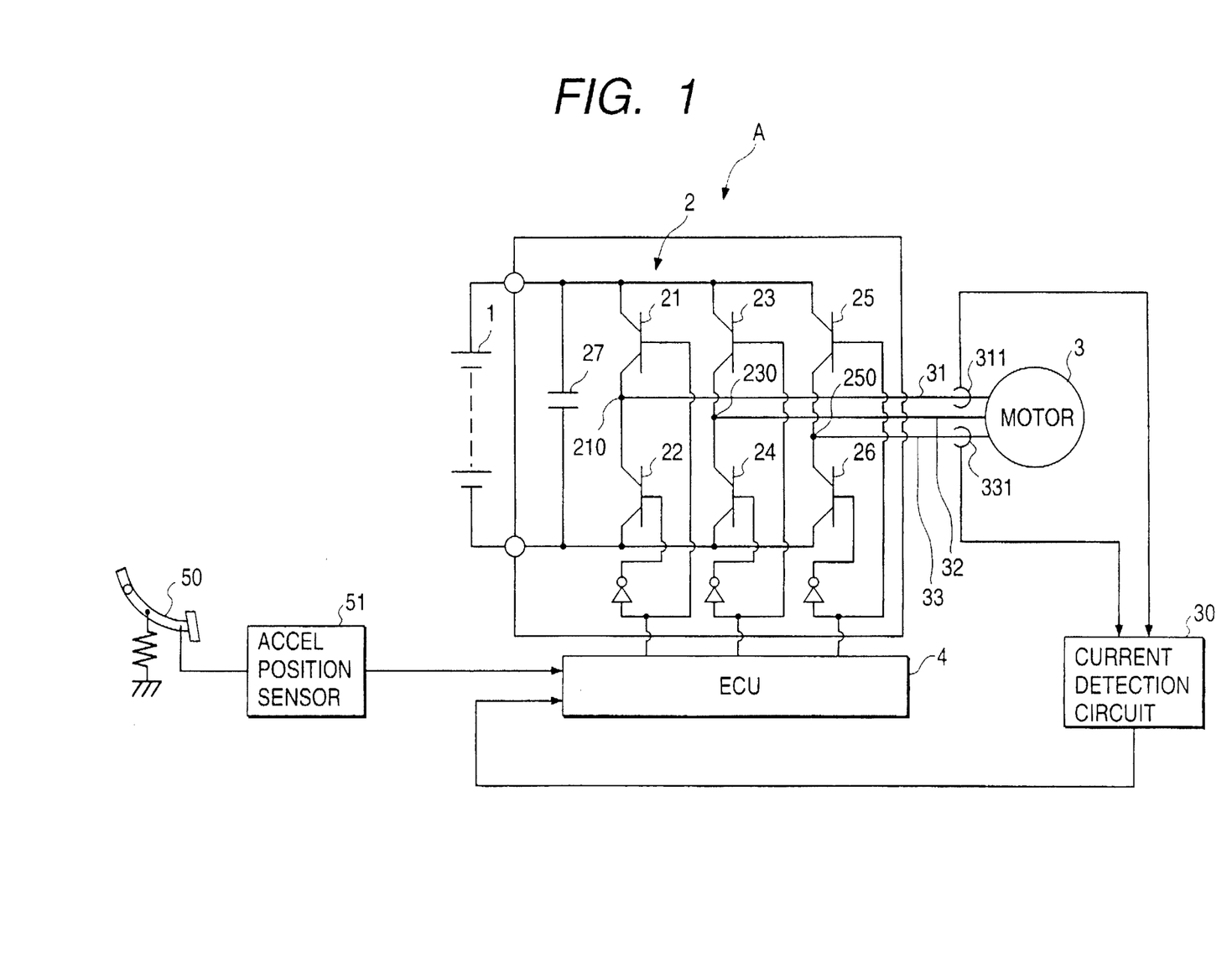
FIG. 1 is a diagram of a control apparatus for a three-phase ac motor according to a first embodiment of this invention.

With reference to FIG. 1, a control apparatus "A" operates on a three-phase ac (alternating current) motor 3. The control apparatus "A" is placed in an electric vehicle (not shown). The control apparatus "A" includes a vehicle battery 1, an inverter circuit 2, and an ECU (electronic control unit) 4. The inverter circuit 2 is connected to the vehicle battery 1, the three-phase ac motor 3, and the ECU 4. Current sensors 311 and 331 are provided on the connection between the inverter circuit 2 and the three-phase ac motor 3. The current sensors 311 and 331 are connected to the ECU 4 via a current detection circuit 30 such as an amplifier. The ECU 4 controls the inverter circuit 2 in response to the output signals of the current detection circuit 30. The ECU 4 includes, for example, a microcomputer or a similar device having a combination of an input/output port, a processing section, a RAM, and a ROM. The ECU 4 operates in accordance with a program stored in the ROM.

The vehicle battery 1 includes, for example, a lead battery. The vehicle battery 1 stores electric power for driving the three-phase ac motor 3 or others.

The inverter circuit 2 includes IGBT's (insulated gate bipolar transistors) 21, 22, 23, 24, 25, and 26, and a smoothing capacitor 27. The smoothing capacitor 27 is connected across the vehicle battery 1. The source-drain paths of the IGBT's 21 and 22 are connected in series. The series combination of the IGBT's 21 and 22 is connected across the vehicle battery 1. The source-drain paths of the IGBT's 23 and 24 are connected in series. The series combination of the IGBT's 23 and 24 is connected across the vehicle battery 1. The source-drain paths of the IGBT's 25 and 26 are connected in series. The series combination of the IGBT's 25 and 26 is connected across the vehicle battery 1.

The three-phase ac motor 3 is a power source for driving the electric vehicle. The three-phase ac motor 3 has three stator windings corresponding to three different phases respectively. The first stator winding of the motor 3 is connected via a connection line 31 to the junction 210 between the IGBT's 21 and 22. The second stator winding of the motor 3 is connected via a connection line 32 to the junction 230 between the IGBT's 23 and 24. The third stator winding of the motor 3 is connected via a connection line 33 to the junction 250 between the IGBT's 25 and 26.

The ECU 4 has three output terminals. The first output terminal of the ECU 4 is connected to the gate of the IGBT 21. The first output terminal of the ECU 4 is connected via an inverter (no reference character) to the gate of the IGBT 22. The second output terminal of the ECU 4 is connected to the gate of the IGBT 23. The second output terminal of the ECU 4 is connected via an inverter (no reference character) to the gate of the IGBT 24. The third output terminal of the ECU 4 is connected to the gate of the IGBT 25. The third output terminal of the ECU 4 is connected via an inverter (no reference character) to the gate of the IGBT 26.

Figure 2:
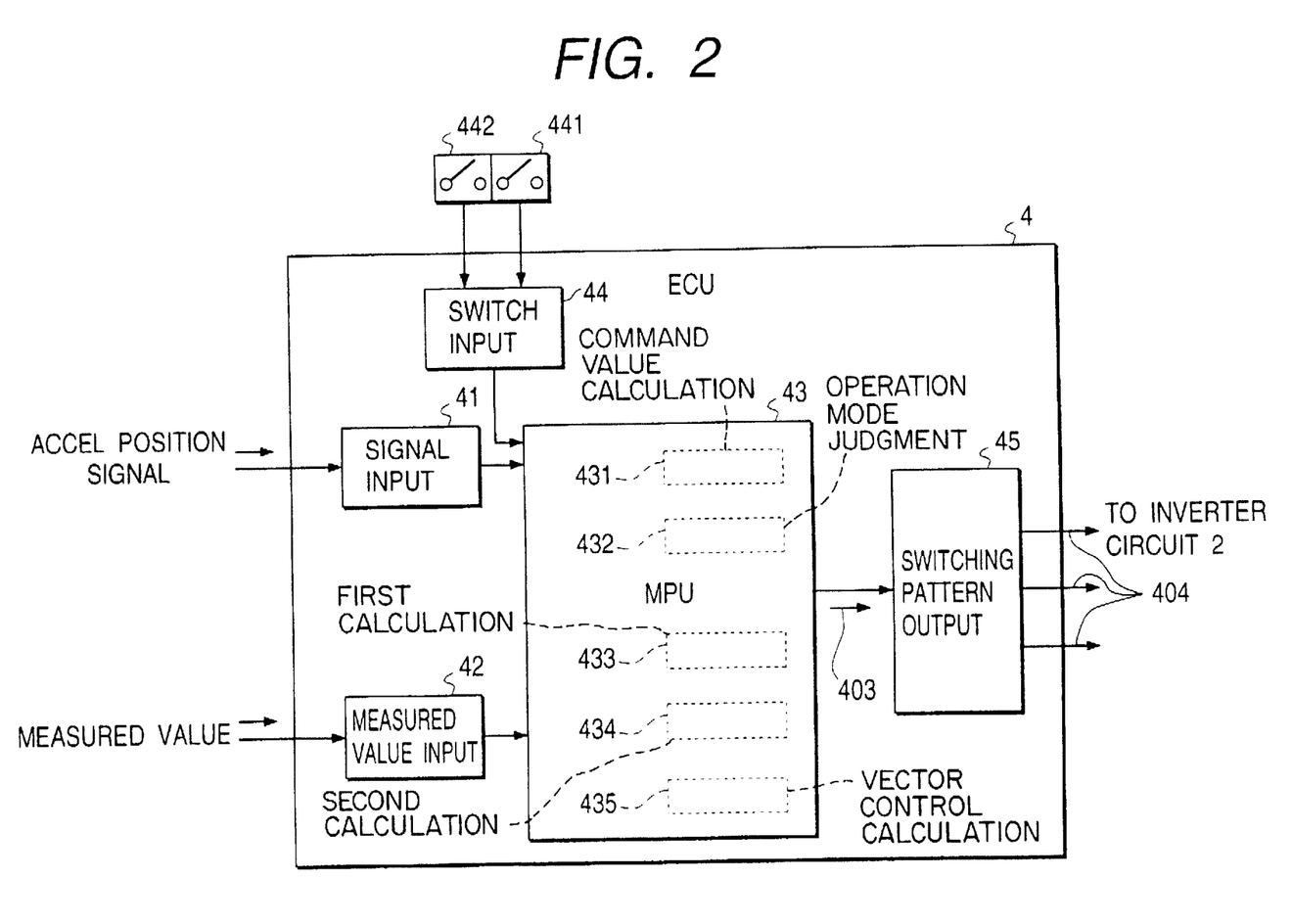
FIG. 2 is a diagram of an ECU (electronic control unit) and related parts in the control apparatus of FIG. 1.

The ECU 4 serves as a vector controller. As shown in FIG. 2, the ECU 4 includes a signal input section 41, a measured value input section 42, an MPU (microprocessor unit) 43, a switch input section 44, and a switching pattern output section 45. The MPU 43 operates in accordance with a program stored in its internal ROM. The MPU 43 serves as a command value calculating means 431, an operation mode judging means 432, a first calculating means 433, a second calculating means 434, and a vector control calculating means 435.

With reference to FIG. 1, the electric vehicle has an accelerator pedal 50. A position sensor 51 connected to the accelerator pedal 50 outputs an accelerator position signal representing the degree of depression of the accelerator pedal 50, that is, a required torque output of the three-phase ac motor 3.

With reference to FIG. 2, the signal input section 41 receives the accelerator position signal from the accelerator position sensor 51 (see FIG. 1) as an indication of the required torque. The signal input section 41 includes, for example, an A/D converter. The signal input section 41 converts the accelerator position signal into a version which can be handled by the MPU 43. The signal input section 41 feeds the resultant signal to the MPU 43. It should be noted that a brake pedal position signal representing the degree of depression of a vehicle brake pedal (not shown) may also be used as an indication of the required torque.

As shown in FIG. 1, the current sensor 311 is associated with the connection line 31 between the inverter circuit 2 and the three-phase ac motor 3 to detect a current flowing along the connection line 31. The current sensor 331 is associated with the connection line 33 between the inverter circuit 2 and the three-phase ac motor 3 to detect a current flowing along the connection line 33. Thus, the current sensors 311 and 331 detect currents fed from the inverter circuit 2 to the related stator windings of the three-phase ac motor 3 respectively. The current detection circuit 30 receives the output signals of the current sensors 311 and 331, and suitably processes the received signals. The current detection circuit 30 outputs the resultant signals to the ECU 4 as an indication of measured current values.

With reference to FIG. 2, the measured value input section 42 receives the output signals of the current detection circuit 30 as an indication of the measured current values. The measured value input section 42 includes, for example, an A/D converter. The measured value input section 42 converts the received signals into versions which can be handled by the MPU 43. The measured value input section 42 feeds the resultant signals to the MPU 43. It should be noted that a signal representing a measured value of the voltage across the vehicle battery 1, a signal representing a measured rotational speed of the three-phase ac motor 3 (an output signal of an encoder or a resolver), and signals representing measured values of the voltages among the connection lines 31, 32, 33 may also be inputted.

The electric vehicle is provided with an operation mode selection switch 441 and a manual switch 442. Operation of the electric vehicle can be changed among different modes. During manual operation of the electric vehicle, the operation mode can be changed by the operation mode selection switch 441. The operation mode selection switch 441 can be changed between first and second positions which correspond to a quicker-torque-response mode and a higher-efficiency mode respectively. The quicker-torque response mode attaches importance to torque response. The higher-efficiency mode attaches importance to energy efficiency. During automatic operation of the electric vehicle, the operation mode can be automatically changed between the quicker-torque response mode and the higher-efficiency mode in response to a condition of a motor-torque command value. The manual switch 442 serves to select one out of the manual operation and the automatic operation. The manual switch 442 can be changed between an on position and an off position. When the manual switch 442 is in its off position, the automatic operation is selected. When the manual switch 442 is in its on position, the manual operation is selected.

The switch input section 44 receives the output signals of the operation mode selection switch 441 and the manual switch 442. The switch input section 44 includes, for example, buffer circuits. The switch input section 44 transmits the output signals of the switches 441 and 442 to the MPU 43.

The switching pattern output section 45 receives an output signal 403 of the MPU 43 which represents command voltages corresponding to a magnetizing-current command value 401 and a torque-current command value 402. The switching pattern output section 45 generates three switching command signals 404 in response to the command voltages, and outputs the switching command signals 404 to the inverter circuit 2.

The MPU 43 periodically calculates a motor-torque command value by referring to the output signal of the signal input section 41 which represents the required torque. This process implemented by the MPU 43 corresponds to the command value calculating means 431.

In the case where the MPU 43 detects from the output signal of the switch input section 44 that the manual switch 442 is in its off position and thus the automatic operation is selected, the MPU 43 monitors the rate of a variation in the motor-torque command value. Here, the rate of a variation in the motor-torque command value corresponds to the result of differentiating the motor-torque command value with respect to time. When the monitored variation rate exceeds a threshold value, the MPU 43 sets the operation mode to a quicker-torque-response mode in which importance is attached to torque response. When the monitored variation rate is equal to or smaller than the threshold value, the MPU 43 sets the operation mode to a higher-efficiency mode in which importance is attached to energy efficiency. These processes implemented by the MPU 43 correspond to the operation mode judging means 432.

In the case where the MPU 43 detects that the higher-efficiency mode is set during the automatic operation, or in the case where the operation mode selection switch 441 is in its position corresponding to the higher-efficiency mode during the manual operation, the MPU 43 calculates a magnetizing-current command value 401 and a torque-current command value 402, which maximize energy efficiency, on the basis of the motor-torque command value. This process implemented by the MPU 43 corresponds to the first calculating means 433.

In the case where the MPU 43 detects that the quicker-torque-response mode is set during the automatic operation, or in the case where the operation mode selection switch 441 assumes its position corresponding to the quicker-torque-response mode during the manual operation, the MPU 43 fixes the magnetizing-current command value 401 to a present value thereof and calculates a torque-current command value 402 from the fixed magnetizing-current command value 401. These processes implemented by the MPU 43 correspond to the second calculating means 434. It should be noted that fixing the magnetizing-current command value 401 to the present value thereof may be replaced by fixing the magnetizing-current command value 401 to a given value.

The MPU 43 determines voltage command values 403 on the basis of the magnetizing-current command value 402, torque-current command value 402, and the measured values represented by the output signals of the measured value input section 42. This process implemented by the MPU 43 corresponds to the vector control calculating means 435. The voltage command values 403 correspond to desired voltages to be applied to the three-phase ac motor 3.

The switching command signals 404 outputted from the ECU 4 to the inverter circuit 2 are PWM (pulse width modulation) signals. The inverter circuit 2 applies different phase voltages to the stator windings of the three-phase ac motor 3 in response to the switching command signals 404 respectively. The inverter circuit 2 is of a PWM type. The switching command signals 404 have voltages which vary in accordance with patterns corresponding to the magnetizing-current command value 401 and the torque-current command value 402.

Figure 3:
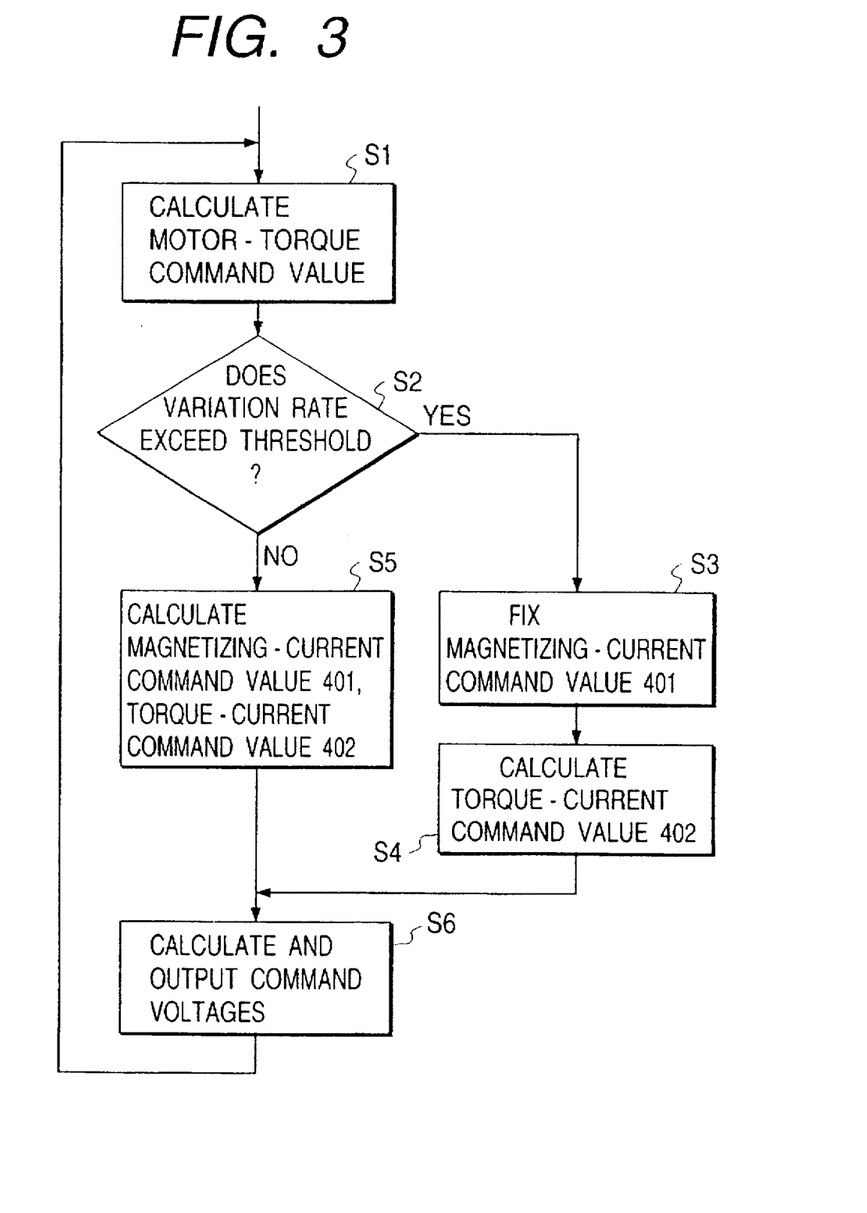
FIG. 3 is a flowchart of a first segment of a control program for the ECU in FIGS. 1 and 2.

As previously described, the ECU 4 (the MPU 43) operates in accordance with a program stored in its internal ROM. FIG. 3 is a flowchart of a segment of the program which is executed when the automatic operation is selected.

With reference to FIG. 3, a step s1 of the program segment calculates a motor-torque command value from the required torque and the measured values. The required torque is represented by the accelerator position signal. The measured values are represented by the output signals of the current detection circuit 30. The step s1 corresponds to the command value calculating means 431.

A step s2 following the step s1 calculates a rate of a variation in the motor-torque command value. The step s2 decides whether or not the calculated variation rate of the motor-torque command value exceeds a threshold value (a given value). When the calculated variation rate of the motor-torque command value exceeds the threshold value, the program advances from the step s2 to a step s3 for implementing the quicker-torque-response mode. When the calculated variation rate of the motor-torque command value does not exceed the threshold value, the program advances from the step s2 to a step s5 for implementing the higher-efficiency mode. The step s2 corresponds to the operation mode judging means 432.

The step s3 fixes a magnetizing-current command value 401 to a present value thereof. The step s3 corresponds to the second calculating means 434. Alternatively, the step s3 may fix the magnetizing-current command value 401 to a given value corresponding to the motor-torque command value.

A step s4 following the step s3 calculates a torque-current command value 402 from the fixed magnetizing-current command value 401. The step s4 also corresponds to the second calculating means 434. After the step s4, the program advances to a step s6.

The calculation by the step s4 is executed by referring to a predetermined chart diagram (a predetermined table) indicating a torque-current command value 402 providing a given motor torque.

Alternatively, the calculation of the step s4 may be of a direct type using motor constants.

The step s5 calculates a magnetizing-current command value 401 and a torque-current command value 402, which maximize energy efficiency, on the basis of the motor-torque command value. The step s5 corresponds to the first calculating means 433. After the step s5, the program advances to the step s6.

Figure 4:
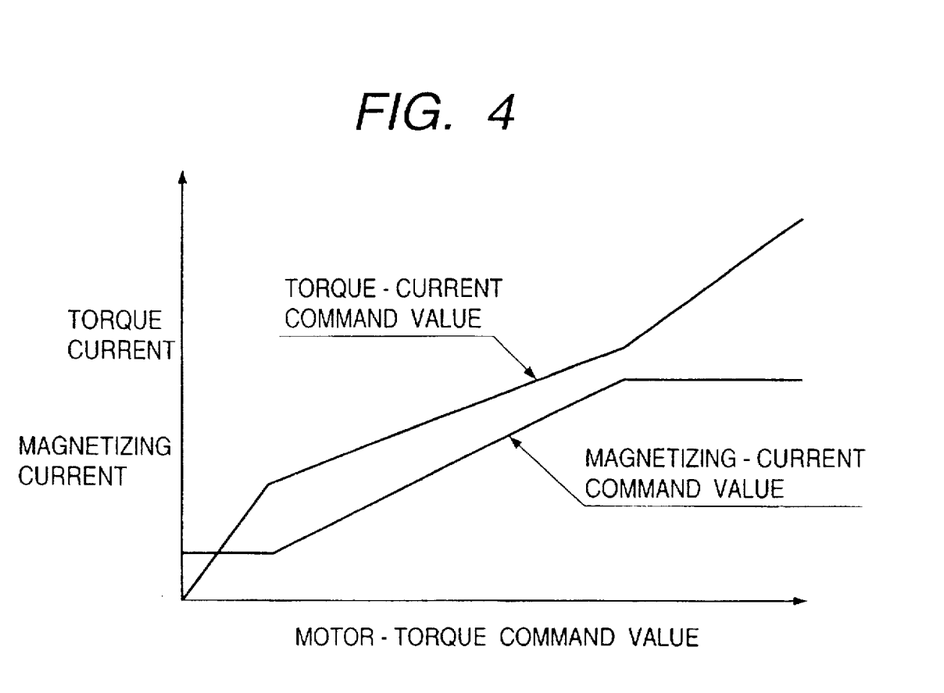
FIG. 4 is a diagram of a predetermined map in the control apparatus of FIG. 1 which provides a relation between a motor-torque command value and a torque-current command value, and also a relation between the motor-torque command value and a magnetizing-current command value.

The ROM within the ECU 4 stores a predetermined map of FIG. 4 which provides a relation between a motor-torque command value and a torque-current command value, and also a relation between the motor-torque command value and a magnetizing-current command value. These relations are predetermined on the basis of various factors such as motor constants, an iron loss, and a copper loss. The calculation by the step s5 is executed by referring to the map of FIG. 4.

The step s6 determines voltage command values 403 on the basis of the magnetizing-current command value 401, the torque-current command value 402, and the measured values represented by the output signals of the current detection circuit 30 (that is, the measured values represented by the output signals of the measured value input section 42). The voltage command values 403 correspond to desired voltages to be applied to the three-phase ac motor 3. The step s6 informs the switching pattern output section 45 of the voltage command values 403. The step s6 corresponds to the vector control calculating section 435. After the step s6, the program returns to the step s1.

As previously described, the switching pattern output section 45 receives information of the voltage command values 403. The switching pattern output section 45 generates three switching command signals 404 in response to the voltage command values 403, and outputs the switching command signals 404 to the inverter circuit 2. The inverter circuit 2 applies actual voltages to the three-phase ac motor 3 in response to the switching command signals 404. As a result of the application of the voltages to the three-phase ac motor 3, a magnetizing current and a torque current corresponding to the magnetizing-current command value 401 and the torque-current command value 402 are actually fed to the three-phase ac motor 3.

Figure 5:
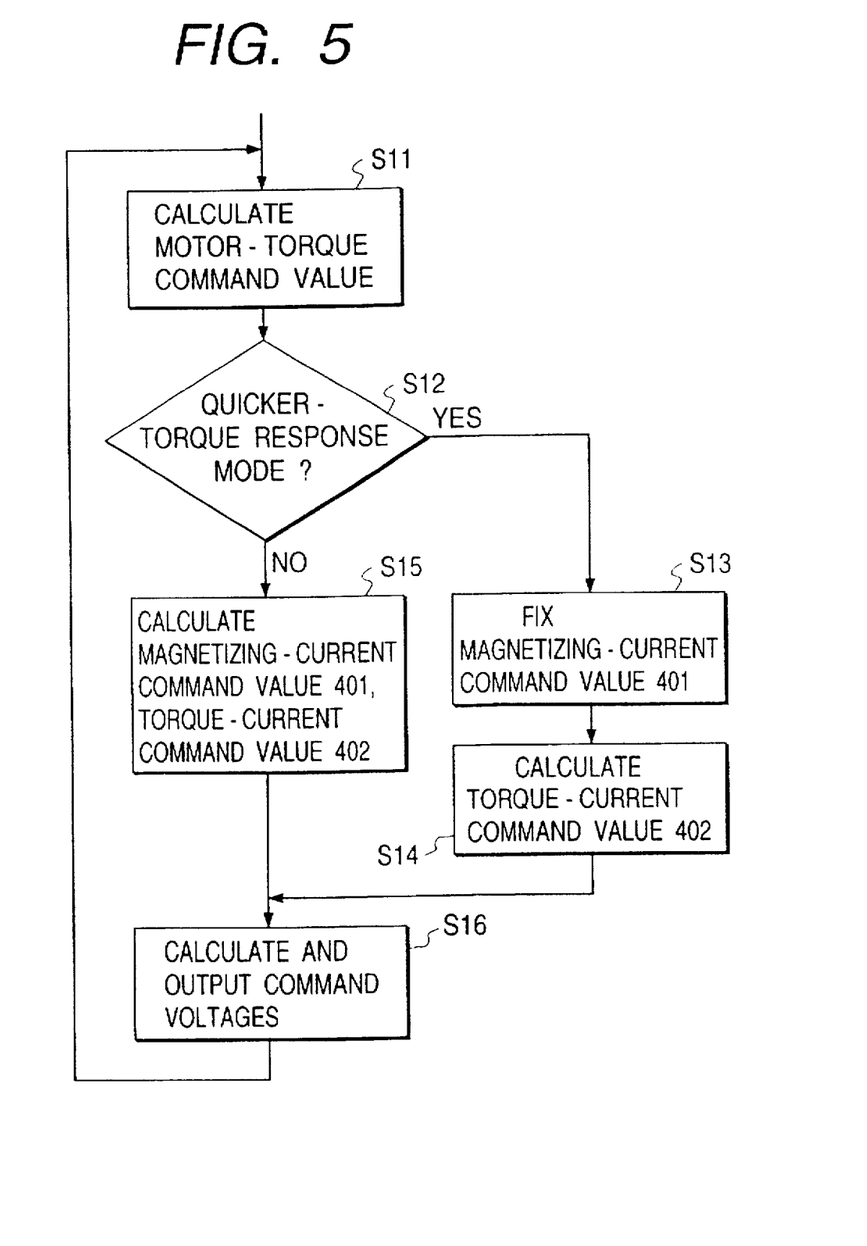
FIG. 5 is a flowchart of a second segment of the control program for the ECU in FIGS. 1 and 2.

As previously described, the ECU 4 (the MPU 43) operates in accordance with the program stored in its internal ROM. FIG. 5 is a flowchart of a segment of the program which is executed when the manual operation is selected (that is, when the manual switch 442 is in its on position).

With reference to FIG. 5, a step s11 of the program segment calculates a motor-torque command value from the required torque and the measured values. The required torque is represented by the accelerator position signal. The measured values are represented by the output signals of the current detection circuit 30. The step s11 corresponds to the command value calculating means 431.

A step s12 following the step s11 decides whether the operation mode selection switch 441 is in its position corresponding to the quicker-torque-response mode or its position corresponding to the higher-efficiency mode by referring to the output signal of the operation mode selection switch 441. When the operation mode selection switch 441 is in its position corresponding to the quicker-torque-response mode, the program advances from the step s12 to a step s13. When the operation mode selection switch 441 is in its position corresponding to the higher-efficiency mode, the program advances from the step s12 to a step s15. The step s12 corresponds to the operation mode judging means 432.

The step s13 fixes a magnetizing-current command value 401 to a present value thereof. The step s13 corresponds to the second calculating means 434. Alternatively, the step s13 may fix the magnetizing-current command value 401 to a given value corresponding to the motor-torque command value.

A step s14 following the step s13 calculates a torque-current command value 402 from the fixed magnetizing-current command value 401. The step s14 also corresponds to the second calculating means 434. After the step s14, the program advances to a step s16. The step s14 is similar to the step s4 in FIG. 3.

The step s15 calculates a magnetizing-current command value 401 and a torque-current command value 402, which maximize energy efficiency, on the basis of the motor-torque command value. The step s15 corresponds to the first calculating means 433. After the step s15, the program advances to the step s16. The step s15 is similar to the step s5 in FIG. 3.

The step s16 determines voltage command values 403 on the basis of the magnetizing-current command value 401, the torque-current command value 402, and the measured values represented by the output signals of the current detection circuit 30 (that is, the measured values represented by the output signals of the measured value input section 42). The voltage command values 403 correspond to desired voltages to be applied to the three-phase ac motor 3. The step s16 informs the switching pattern output section 45 of the voltage command values 403. The step s16 corresponds to the vector control calculating section 435. After the step s16, the program returns to the step s11.

As previously described, the switching pattern output section 45 receives information of the voltage command values 403. The switching pattern output section 45 generates three switching command signals 404 in response to the voltage command values 403, and outputs the switching command signals 404 to the inverter circuit 2. The inverter circuit 2 applies actual voltages to the three-phase ac motor 3 in response to the switching command signals 404. As a result of the application of the voltages to the three-phase ac motor 3, a magnetizing current and a torque current corresponding to the magnetizing-current command value 401 and the torque-current command value 402 are actually fed to the three-phase ac motor 3.

A description will now be given of advantages provided by the above-described embodiment of this invention. Since the manual switch 442 is provided, selection of one out of the quicker-torque-response mode and the higher-efficiency mode can be implemented either manually or automatically in accordance with the vehicle driver's requirement.

Figure 6:
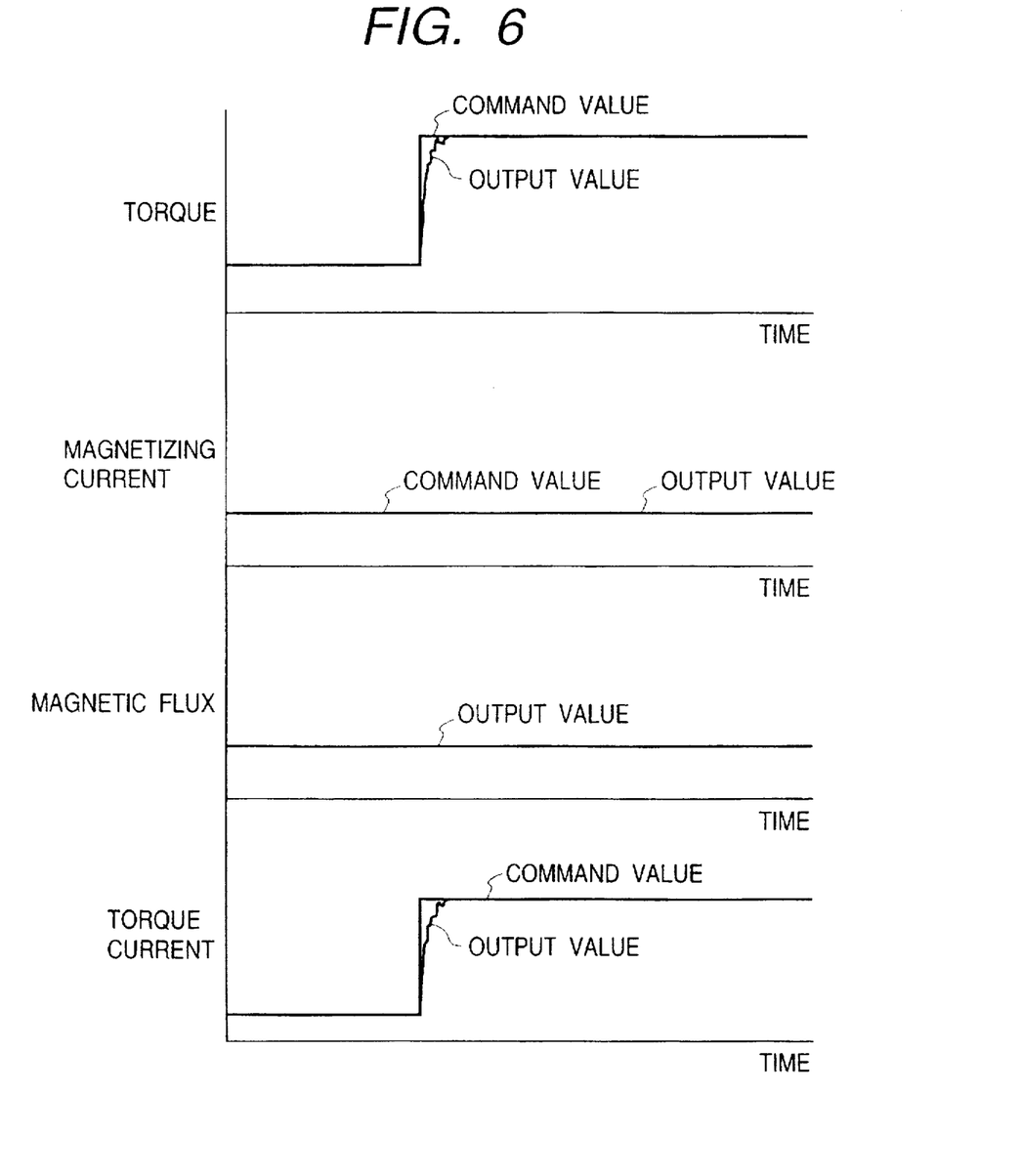
FIG. 6 is a time-domain diagram of various parameters in the control apparatus and the three-phase ac motor in FIG. 1.
Figure 7:
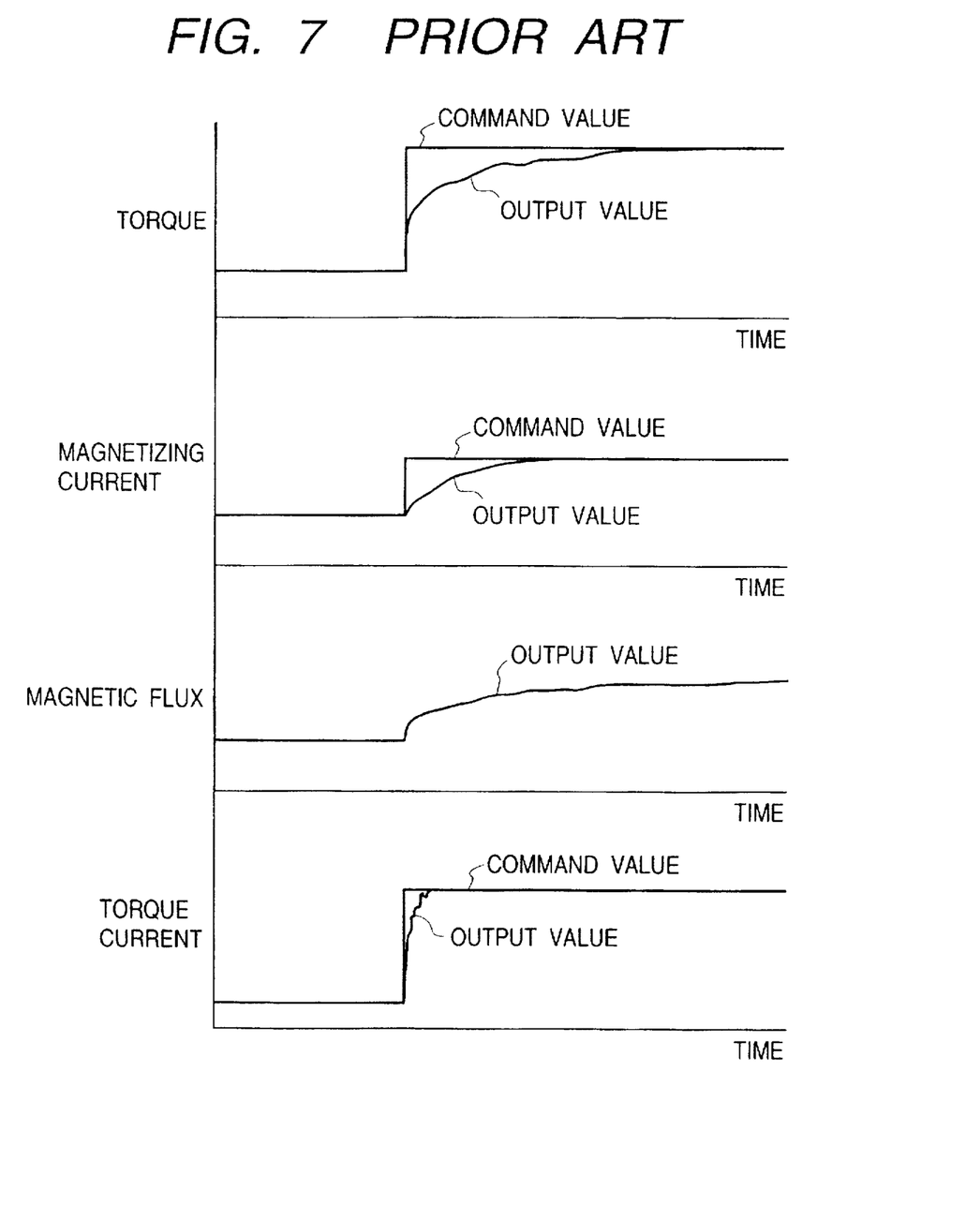
FIG. 7 is a time-domain diagram of various parameters in a prior-art control apparatus and a three-phase ac motor.

During the automatic operation, when the accelerator pedal 50 is abruptly or quickly depressed to a considerable degree, the program in FIG. 3 advances from the step s2 to the step s3 for implementing the quicker-torque-response mode. Thus, in this case, the step s3 fixes the magnetizing-current command value 401 to the present value thereof, and the step s4 calculates the torque-current command value 402 from the fixed magnetizing-current command value 401. Accordingly, the resultant torque-current command value 402 is made quickly responsive to the change of the accelerator pedal position. The inverter circuit 2 supplies the three-phase ac motor 3 with a constant magnetizing current and a torque current which quickly responds to the change of the accelerator pedal position. Therefore, as shown in FIG. 6, enhanced torque response characteristics of the three-phase ac motor 3 are available. For reference, torque response characteristics of a three-phase ac motor driven by a prior-art apparatus are illustrated in FIG. 7. According to the embodiment of this invention, the electric vehicle is quickly accelerated in response to the depression of the accelerator pedal 50.

During the automatic operation, when the accelerator pedal 50 is slowly depressed, the program in FIG. 3 advances from the step s2 to the step s5 for implementing the higher-efficiency mode. Thus, in this case, the step s5 calculates the magnetizing-current command value 401 and the torque-current command value 402, which maximize energy efficiency, on the basis of the motor-torque command value. Therefore, the inverter circuit 2 supplies the three-phase ac motor 3 with a magnetizing current and a torque current which correspond to the magnetizing-current command value 401 and the torque-current command 402 respectively. Thus, the three-phase ac motor 3 and also the electric vehicle are efficiently operated.

As previously described, the electric vehicle is efficiently operated in the case where the accelerator pedal 50 is slowly depressed. On the other hand, in the case where high acceleration of the electric vehicle is required, the accelerator pedal 50 is quickly depressed so that the quicker-torque-response mode is automatically started. Thus, it is possible to meet the requirement for high acceleration of the electric vehicle.

During the manual operation, when the operation mode selection switch 441 is in its position corresponding to the quicker-torque-response mode, the program in FIG. 5 advances from the step s12 to the step s13 for implementing the quicker-torque-response mode. Thus, in this case, the step s13 fixes the magnetizing-current command value 401 to the present value thereof, and the step s14 calculates the torque-current command value 402 from the fixed magnetizing-current command value 401. Accordingly, the resultant torque-current command value 402 is made quickly responsive to the change of the accelerator pedal position. The inverter circuit 2 supplies the three-phase ac motor 3 with a constant magnetizing current and a torque current which quickly responds to the change of the accelerator pedal position. Therefore, as shown in FIG. 6, enhanced torque response characteristics of the three-phase ac motor 3 are available. For reference, torque response characteristics of a three-phase ac motor driven by a prior-art apparatus are illustrated in FIG. 7. According to the embodiment of this invention, the electric vehicle is quickly accelerated in response to the depression of the accelerator pedal 50.

During the manual operation, when the operation mode selection switch 441 is in its position corresponding to the higher-efficiency mode, the program in FIG. 5 advances from the step s12 to the step s15 for implementing the higher-efficiency mode. Thus, in this case, the step s15 calculates the magnetizing-current command value 401 and the torque-current command value 402, which maximize energy efficiency, on the basis of the motor-torque command value. Therefore, the inverter circuit 2 supplies the three-phase ac motor 3 with a magnetizing current and a torque current which correspond to the magnetizing-current command value 401 and the torque-current command 402 respectively. Thus, the three-phase ac motor 3 and also the electric vehicle are efficiently operated.

As previously described, the electric vehicle is efficiently operated in the case where the operation mode selection switch 441 is in its position corresponding to the higher-efficiency mode. On the other hand, the electric vehicle can be quickly accelerated in the case where the operation mode selection switch 441 is in its position corresponding to the quicker-torque-response mode. It should be noted that the operation mode selection switch 441 may be changed to its position corresponding to the quicker-torque-response mode when high acceleration of the electric vehicle is required.

As previously described, the switching command signals 404 outputted from the ECU 4 to the inverter circuit 2 are PWM (pulse width modulation) signals. The inverter circuit 2 applies different phase voltages to the stator windings of the three-phase ac motor 3 in response to the switching command signals 404 respectively. The inverter circuit 2 is of the PWM type. The switching command signals 404 have voltages which vary in accordance with patterns corresponding to the magnetizing-current command value 401 and the torque-current command value 402. Therefore, the three-phase ac motor 3 can be supplied with a magnetizing current and a torque current which accurately agree with the magnetizing-current command value 401 and the torque-current command value 402 respectively. The accurate agreement between the actual currents and the command values provides a high control efficiency.

As previously described, the current sensors 311 and 331 detect the currents flowing along the connection lines 31 and 33 respectively. The ECU 4 considers the detected currents in the calculation of the motor-torque command value. Therefore, the available motor-torque command value is good so that the electric vehicle can travel at a desired speed.

Second Embodiment

A second embodiment of this invention is similar to the first embodiment thereof except for the following design changes. The second embodiment of this invention includes a device for detecting the amount of electric energy remaining in the vehicle battery 1. According to the second embodiment of this invention, when the detected amount of electric energy drops to or below a half of the maximum amount (corresponding to the fully charged state of the vehicle battery 1 or the state of the full charge of the vehicle battery 1), the higher-efficiency mode is forcedly implemented regardless of the position of the operation mode selection switch 441 or the rate of depression of the accelerator pedal 50.

Third Embodiment

A third embodiment of this invention is similar to the first embodiment thereof except that the ECU 4 is programmed to provide a low pass filter processing the magnetizing-current command value 401 during the higher-efficiency mode.

Fourth Embodiment

A fourth embodiment of this invention is similar to the first embodiment thereof except that the ECU 4 is programmed to provide low pass filters processing the magnetizing-current command value 401 and the torque-current command value 402 during the higher-efficiency mode.

Fifth Embodiment

A fifth embodiment of this invention is similar to the first embodiment thereof except for the following design changes. The fifth embodiment of this invention is designed for a polyphase ac motor having independent magnetizing windings. The fifth embodiment of this invention includes a magnetizing-current feed circuit which supplies the polyphase ac motor with a magnetizing current corresponding to the magnetizing-current command value 401.

Sixth Embodiment

A sixth embodiment of this invention is similar to the first embodiment thereof except that the three-phase ac motor 3 is replaced by another type of an induction motor, a synchronous motor, or a reluctance motor.

Seventh Embodiment

A seventh embodiment of this invention is similar to the first embodiment thereof except for the following design changes. In the seventh embodiment of this invention, the ECU 4 is programmed to decide whether or not a magnetizing current to the three-phase ac motor 3 is low and hence a desired torque is unavailable during the quicker-torque-response mode.

Figure 8:
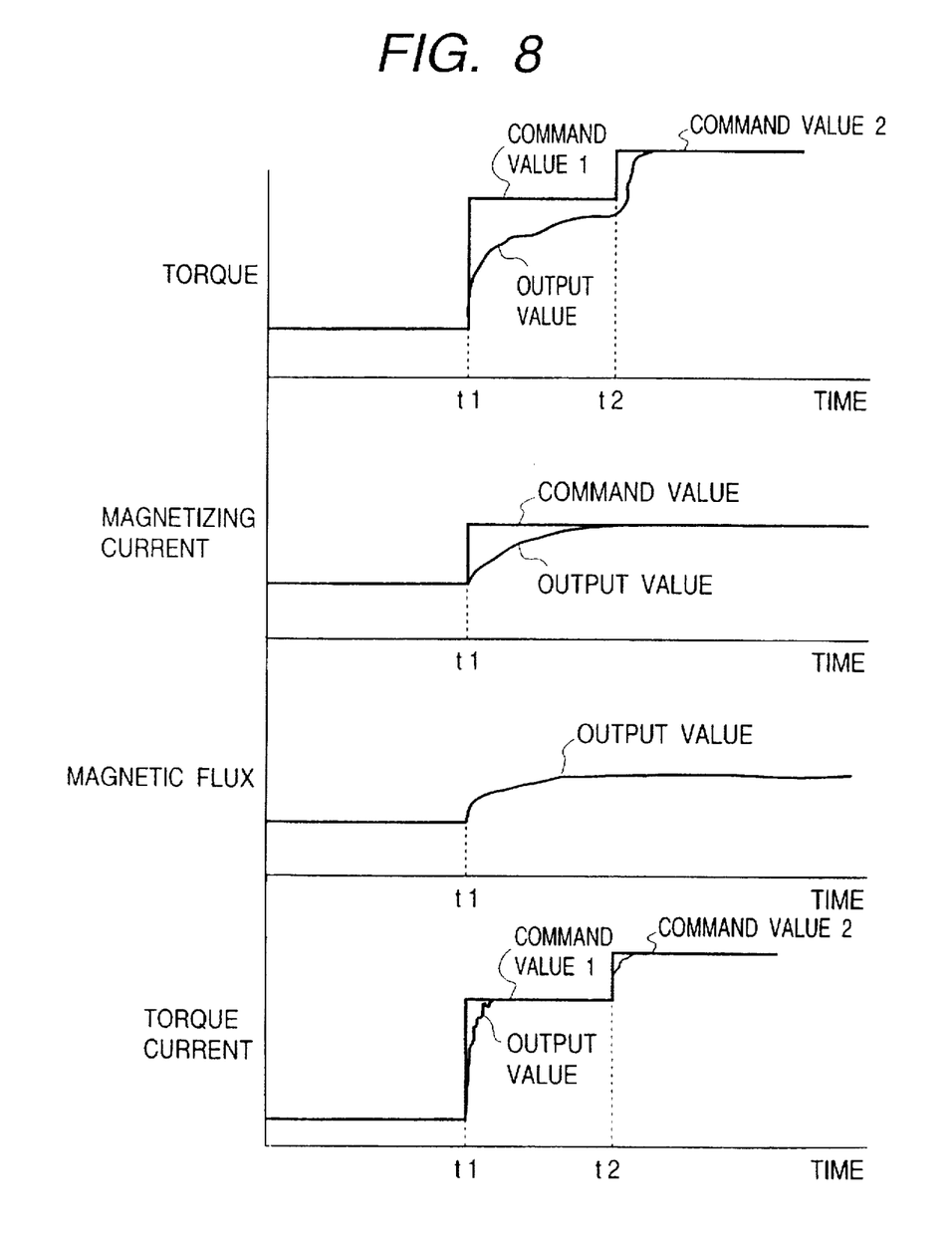
FIG. 8 is a time-domain diagram of various parameters in a control apparatus and a three-phase ac motor according to a seventh embodiment of this invention.

With reference to FIG. 8, in the case where the ECU 4 decides that the magnetizing current to the three-phase ac motor 3 is low and hence the desired torque is unavailable during the quicker-torque-response mode, a torque-current command value "1" greater than the present value thereof by a given value starts to be outputted at a moment t1. Then, at a moment t2, the torque-current command value is increased to a value "2" while a magnetizing-current command value remains fixed.

In the seventh embodiment of this invention, an actual torque current can be increased at a higher rate, and enhanced torque response characteristics of the three-phase ac motor 3 are available.

Eighth Embodiment

An eighth embodiment of this invention is similar to the first embodiment thereof except that the ECU 4 is programmed to provide low pass filters processing the magnetizing-current command value 401 and the torque-current command value 402.

Figure 9:
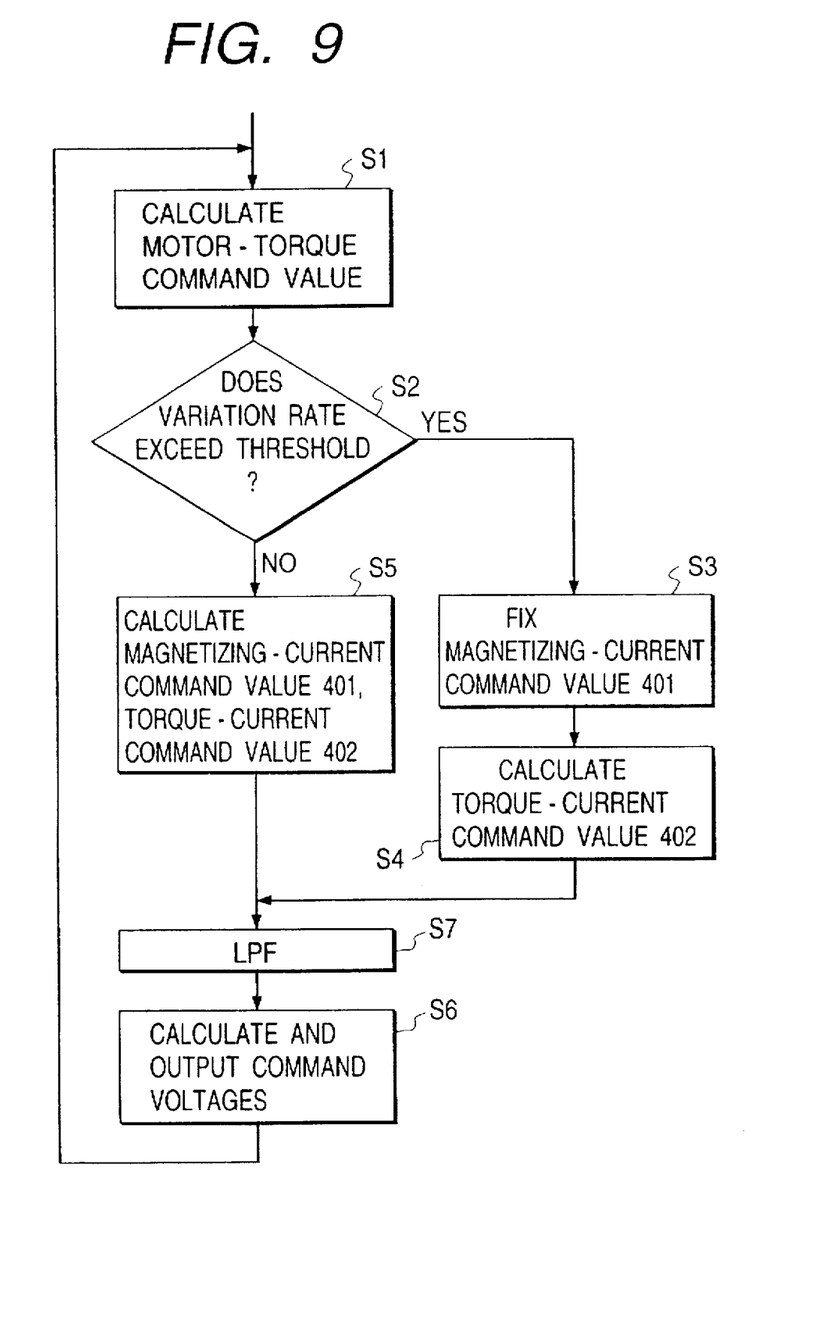
FIG. 9 is a flowchart of a segment of a control program for an ECU in an eighth embodiment of this invention.

The eighth embodiment uses a program segment of FIG. 9 instead of the program segment of FIG. 3. The program segment of FIG. 9 includes a step s7 following the steps s4 and s5. The step s7 subjects the magnetizing-current command value 401 and the torque-current command value 402 to low pass filtering processes. After the step s7, the program advances to the step s6.

Ninth Embodiment

A ninth embodiment of this invention is similar to the first embodiment thereof except for design changes indicated hereinafter. The ninth embodiment uses a program segment of FIG. 10 instead of the program segment of FIG. 3.

Figure 10:
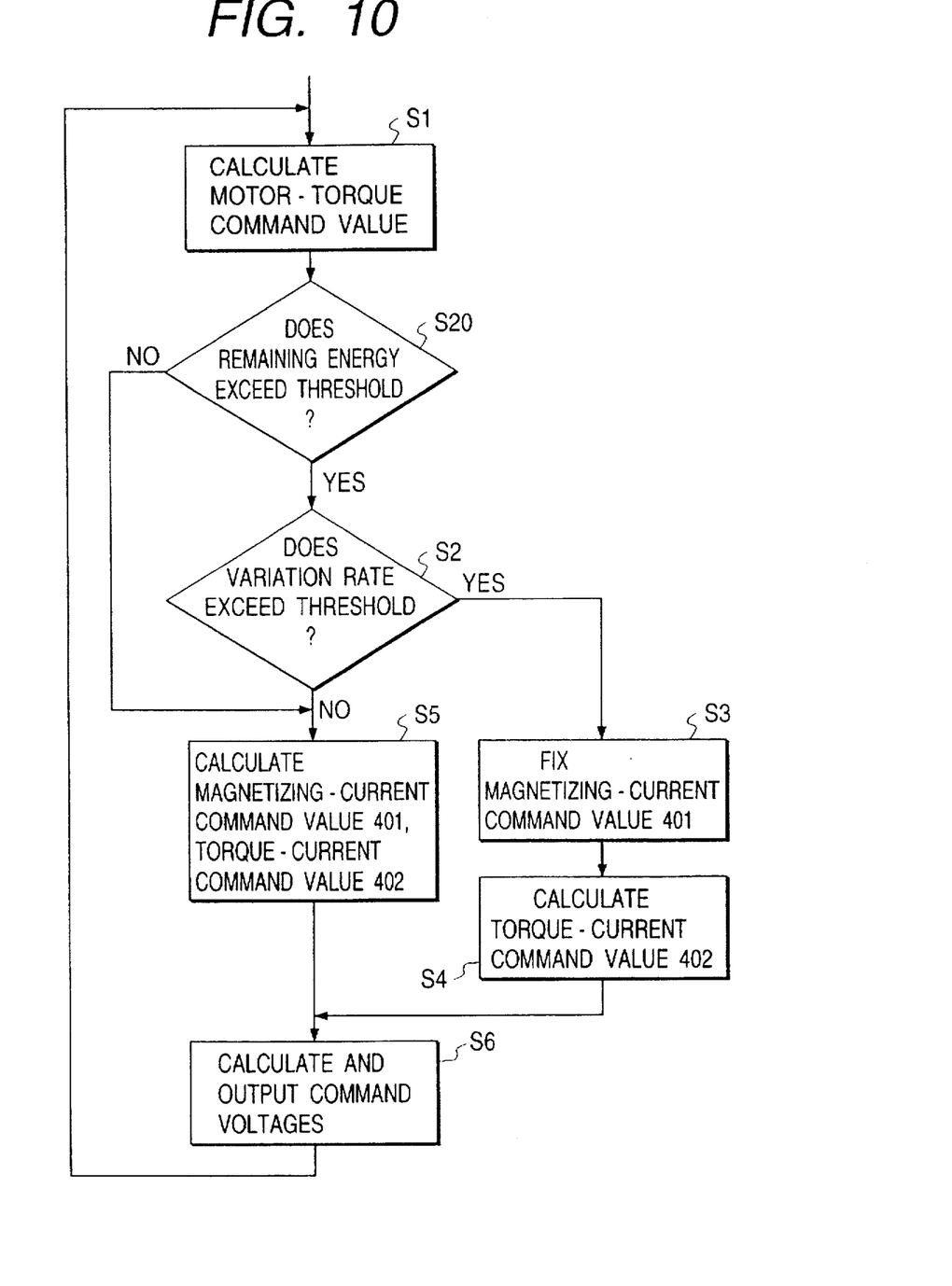
FIG. 10 is a flowchart of a segment of a control program for an ECU in a ninth embodiment of this invention.

The program segment of FIG. 10 includes a step s20 following the step s1. The step s20 detects the voltage across the vehicle battery 1. It should be noted that the ECU 4 is connected to the vehicle battery 1 to be powered thereby. The step s20 calculates an amount of electric energy remaining in the vehicle battery 1 on the basis of the detected voltage thereacross. The step s20 compares the calculated amount of remaining electric energy with a threshold amount. When the calculated amount of remaining electric energy is equal to or smaller than the threshold amount, the program advances from the step s20 to the step s5 to implement the higher-efficiency mode of operation. Otherwise, the program advances from the step s20 to the step s2.

Tenth Embodiment

A tenth embodiment of this invention is similar to the first embodiment thereof except for design changes indicated hereinafter. The tenth embodiment uses a program segment of FIG. 11 instead of the program segment of FIG. 5.

Figure 11:
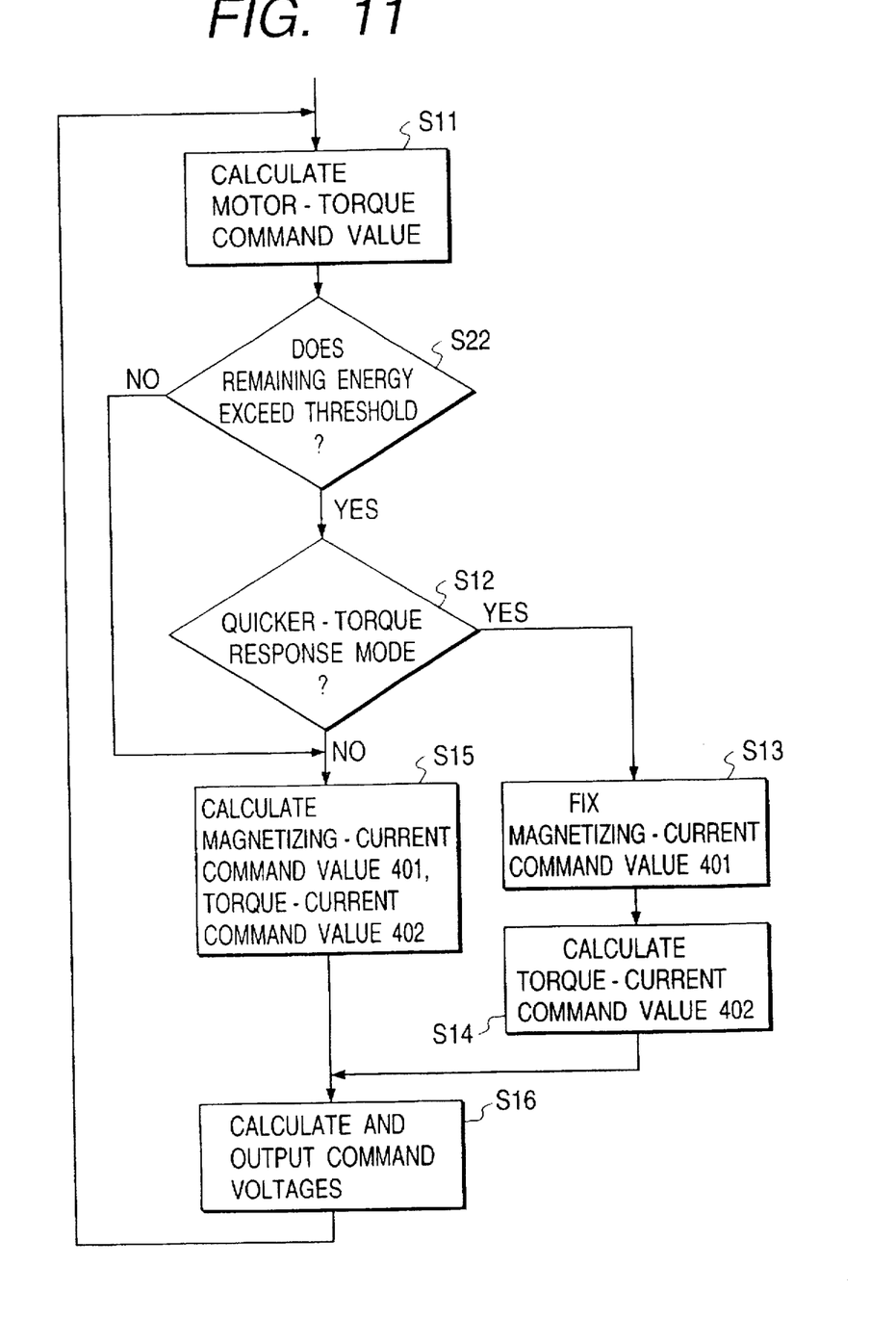
FIG. 11 is a flowchart of a segment of a control program for an ECU in a tenth embodiment of this invention.

The program segment of FIG. 11 includes a step s22 following the step s11. The step s22 detects the voltage across the vehicle battery 1. It should be noted that the ECU 4 is connected to the vehicle battery 1 to be powered thereby. The step s22 calculates an amount of electric energy remaining in the vehicle battery 1 on the basis of the detected voltage thereacross. The step s22 compares the calculated amount of remaining electric energy with a threshold amount. When the calculated amount of remaining electric energy is equal to or smaller than the threshold amount, the program advances from the step s22 to the step s15 to implement the higher-efficiency mode of operation. Otherwise, the program advances from the step s22 to the step s12.

What is claimed is:

1. A control apparatus for a polyphase ac motor, comprising:

a battery;

an inverter circuit, connected to the battery, said inverter including a plurality of sets of switches, each of said sets of switches having a series combination of two switching elements, wherein two ends of each of said sets of switches are connected to the battery, and a junction between the two switching elements in each of said sets of switches is electrically connected to a respective terminal of the polyphase ac motor; and a vector controller for controlling the inverter circuit on the basis of a torque-current command value and a magnetizing-current command value;

wherein the vector controller comprises:

a) command value calculating means for calculating a motor-torque command value on the basis of a required torque such as a degree of depression of an accelerator pedal;

b) operation mode judging means for judging an operation mode to be a quicker-torque-response mode or a higher-efficiency mode, the quicker-torque-response mode having quicker torque response than the higher-efficiency mode, the higher-efficiency mode having higher energy efficiency than the quicker-torque-response mode;

c) first calculating means for, in cases where the operation mode judging means judges the operation mode to be the higher-efficiency mode, calculating the magnetizing-current command value and the torque-current command value, which maximizes an energy efficiency, on the basis of the motor-torque command value; and d) second calculating means for, in cases where the operation mode judging means judges the operation mode to be the quicker-torque-response mode, fixing the magnetizing-current command value to a present value thereof and calculating the torque-current command value from the fixed magnetizing-current command value and the motor-torque command value.

2. A control apparatus as recited in claim 1, wherein the command value calculating means is operative for calculating the motor-torque command value in view of measured values of currents flowing through the polyphase ac motor, a voltage across the battery, a rotational speed of the polyphase ac motor, and voltages among different terminals of the polyphase ac motor.

3. A control apparatus as recited in claim 1, wherein the operation mode judging means is operative for judging the operation mode to be the quicker-torque-response mode when a rate of a variation in the motor-torque command value calculated by the command value calculating means is greater than a threshold value, and is operative for judging the operation mode to be the higher-efficiency mode when the rate of the variation in the motor-torque command value calculated by the command value calculating means is smaller than said threshold value.

4. A control apparatus as recited in claim 1, further comprising a mode selection switch for manually selecting one out of the quicker-torque-response mode and the higher-efficiency mode, wherein the operation mode judging means is operative for judging the operation mode to be the quicker-torque-response mode when the quicker-torque-response mode is selected by the mode selection switch, and is operative for judging the operation mode to be the higher-efficiency mode when the higher-efficiency mode is selected by the mode selection switch.

5. A control apparatus as recited in claim 1, further comprising remaining energy detecting means for detecting an amount of electric energy remaining in the battery, wherein the operation mode judging means is operative for judging the operation mode to be the higher-efficiency mode when the detected amount of electric energy remaining in the battery is less than a given value.

6. A control apparatus as recited in claim 1, wherein the first calculating means is further for low pass filtering the magnetizing-current command value.

7. A control apparatus as recited in claim 1, wherein the first calculating means is further for low pass filtering the magnetizing-current command value and the torque-current command value.

* * * * *